(12) United States Patent
Mikawa

(10) Patent No.: US 10,148,861 B2
(45) Date of Patent: Dec. 4, 2018

(54) IMAGE PICKUP APPARATUS GENERATING FOCUS CHANGEABLE IMAGE, CONTROL METHOD FOR IMAGE PICKUP APPARATUS, AND STORAGE MEDIUM

(71) Applicant: CANON KABUSHIKI KAISHA, Tokyo (JP)

(72) Inventor: Takuma Mikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 14/669,289

(22) Filed: Mar. 26, 2015

(65) Prior Publication Data

US 2015/0288872 A1 Oct. 8, 2015

(30) Foreign Application Priority Data

Apr. 2, 2014 (JP) .................. 2014-076175

(51) Int. Cl.
*H04N 5/232* (2006.01)

(52) U.S. Cl.
CPC ..... *H04N 5/23212* (2013.01); *H04N 5/23216* (2013.01)

(58) Field of Classification Search
CPC ........... H04N 5/23212; H04N 5/23216; H04N 5/2254; H04N 5/2253; H04N 5/247; H04N 5/378; H04N 5/23293
See application file for complete search history.

(56) References Cited

U.S. PATENT DOCUMENTS

| 5,625,415 A | * | 4/1997 | Ueno ................. H04N 5/23212 348/346 |
|---|---|---|---|
| 7,505,674 B2 | | 3/2009 | Mikawa |
| 7,565,056 B2 | | 7/2009 | Mikawa |
| 8,581,996 B2 | | 11/2013 | Inomata et al. |

(Continued)

FOREIGN PATENT DOCUMENTS

| CN | 101753775 A | 6/2010 |
|---|---|---|
| CN | 103327223 A | 9/2013 |

(Continued)

OTHER PUBLICATIONS

Office Action in Chinese Patent Application No. 201510155073.2, dated Jul. 17, 2017 (with English translation).

*Primary Examiner* — Twyler Haskins
*Assistant Examiner* — Carramah J Quiett
(74) *Attorney, Agent, or Firm* — Fitzpatrick, Cella, Harper & Scinto

(57) ABSTRACT

An image pickup apparatus which is capable of easily generating a developed image file from image data obtained using the light field technique. A first recording mode in which data obtained from signals having different focuses is recorded as refocusable first data or a second recording mode in which data which is obtained by carrying out a development process on the data is recorded as non-refocusable second data is selected. During captured image review, at least one focus position in the image data is set as focus information. Based on the recording mode and the focus information, whether to generate a RAW image file or generate a developed image file is determined. When the RAW image file is to be generated and recorded in response to the determination, the focus information is added to the RAW image file.

7 Claims, 10 Drawing Sheets

(56) References Cited

U.S. PATENT DOCUMENTS

| | | | |
|---|---|---|---|
| 9,013,601 B2 | 4/2015 | Mikawa | |
| 9,036,072 B2 | 5/2015 | Nagamatsu | |
| 9,451,148 B2 | 9/2016 | Sugawara | |
| 9,571,718 B2 | 2/2017 | Suzuki et al. | |
| 2002/0171750 A1* | 11/2002 | Kato | H04N 5/2254 348/345 |
| 2007/0070238 A1* | 3/2007 | Sugimoto | H04N 5/23212 348/345 |
| 2008/0170152 A1* | 7/2008 | Fujii | H04N 5/23212 348/345 |
| 2009/0142037 A1 | 6/2009 | Mikawa | |
| 2013/0250159 A1 | 9/2013 | Nagasaka | |
| 2013/0329068 A1 | 12/2013 | Hamanaka et al. | |
| 2013/0335618 A1 | 12/2013 | Sugawara | |
| 2014/0072271 A1 | 3/2014 | Hamada et al. | |
| 2015/0222810 A1 | 8/2015 | Nagamatsu | |
| 2017/0126967 A1 | 5/2017 | Suzuki et al. | |

FOREIGN PATENT DOCUMENTS

| | | | |
|---|---|---|---|
| JP | 2006-189571 A | 7/2006 |
| JP | 2007-004471 A | 1/2007 |
| JP | 2010-212965 A | 9/2010 |
| JP | 2011-155696 A | 8/2011 |
| JP | 2013-198016 A | 9/2013 |
| JP | 2013-247478 A | 12/2013 |
| JP | 2013-254151 A | 12/2013 |
| JP | 2013-254432 A | 12/2013 |
| JP | 2014-003404 A | 1/2014 |
| JP | 2014-057141 A | 3/2014 |

\* cited by examiner

IMAGE PICKUP APPARATUS GENERATING FOCUS CHANGEABLE IMAGE, CONTROL METHOD FOR IMAGE PICKUP APPARATUS, AND STORAGE MEDIUM

BACKGROUND OF THE INVENTION

Field of the Invention

The present invention relates to an image pickup apparatus, a control method for the image pickup apparatus, and a storage medium.

Description of the Related Art

As one example of image processing apparatuses, there are image pickup apparatuses such as digital cameras. Image pickup apparatuses called light field cameras, having a refocusing function of generating an image with its focal length changed after shooting, are known.

When a light field camera executes a process of shooting, RAW data including minimally processed data from an image sensor (image pickup device) is typically recorded in memory (see Japanese Laid-Open Patent Publication (Kokai) No. 2007-4471).

Accordingly, to display the RAW data obtained by a light field camera on a display unit, it is necessary to determine not only adjustment items of a general development process (such as exposure, white balance, contrast and sharpness), but also a focal length, and based on these items, perform a development process on the RAW data.

For example, according to Japanese Laid-Open Patent Publication (Kokai) No. 2007-4471, when data obtained by a light field camera is required to be stored in memory after converting the obtained data into a still image file in JEPG format, it is necessary to set a focus position with respect to the obtained data after shooting, perform a development process, and generate a still image file. For this reason, it takes a user a lot of time and effort to see an image file.

SUMMARY OF THE INVENTION

The present invention provides an image pickup apparatus which is capable of easily generating a developed image file from image data capable of refocusing after being taken, a control method for the image pickup apparatus, and a storage medium.

Accordingly, the present invention provides an image pickup apparatus comprising: a selection unit configured to select one of a first recording mode in which data obtained based on a plurality of signals having different focuses is recorded as first data in a refocusable format, and a second recording mode in which data in a non-refocusable format, which is obtained by carrying out a development process on the data obtained based on the plurality of signals, is recorded as second data, a first setting unit configured to set a focal length before recording the data obtained based on the plurality of signals into a recording medium as the first data and the second data, and a storage control unit configured to, when the first recording mode is selected by the selection unit, provide control to store the first data in association with information indicative of the set focal length into the recording medium, and when the second recording mode is selected by the selection unit, provide control to store the second data obtained by carrying out the development process on the data obtained based on the plurality of signals using the set focal length into the recording medium.

According to the present invention, whether to generate a RAW image file or generate a developed image file is determined based on a recording mode and focus information. The RAW image file is recorded with focus information in the recording unit. As a result, a developed image file with a desired focus is easily generated from the RAW image file.

Further features of the present invention will become apparent from the following description of embodiments (with reference to the attached drawings).

DESCRIPTION OF THE EMBODIMENTS

Description will now be given of image processing apparatuses according to embodiments of the present invention with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
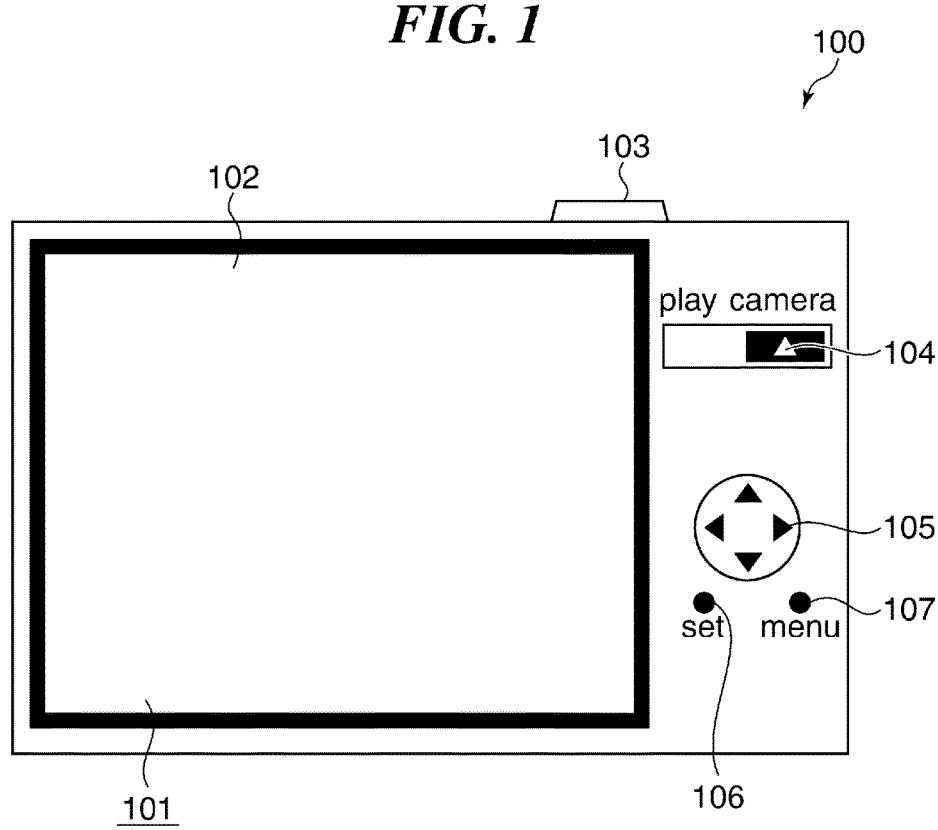
FIG. 1 illustrates an image pickup apparatus according to the present invention.

FIG. 1 is a view showing an image pickup apparatus taken from behind according to a first embodiment of the present invention.

The image pickup apparatus in FIG. 1 is, for example, a digital camera (hereafter referred to merely as the camera) 100. The camera 100 is capable of recording image data in RAW format (RAW data) which has not yet been developed, and image data which has already been developed and converted into a format such as JPEG format or TIFF format.

The camera 100 directly outputs image data of which the light quantity has been measured by an image pickup device, and records a plurality of pieces of RAW data having different focuses obtained using the so called light-field technique. The camera 100 is also capable of setting focus parameters as focus information during the captured image review immediately after the image is taken, as described below.

Further, the camera 100 has at least a shooting mode and an image playback mode. In the shooting mode, a user is allowed to choose and determine whether to record RAW data obtained by shooting, or to record data in JPEG format (developed data) as data which has been subjected to the development process. Namely, in the present embodiment, RAW data is data in a refocusable format from which desired data can be generated by adjusting not only the general items of the development process (such as exposure, white balance, contrast and sharpness), but a focus position and a depth of field. On the other hand, developed data is data in an unrefocusable format of which the focus position and the depth of field as well as the general items of the development process described above cannot be adjusted.

Referring to FIG. 1, the camera 100 has a user interface 101 on a rear side thereof, and the user interface 101 has a monitor 102 on which an image obtained by shooting, shooting information, or the like is displayed.

Also, the user interface 101 has a shutter button 103, a mode selection switch 104, an operating button 105, a set button 106, and a menu button 107.

The shutter button 103 is disposed on an upper surface of a casing for the camera 100, and in response to the user pressing the shutter button 103, the camera 100 performs a shooting process. The mode selection switch 104, the operating button 105, the set button 106, and the menu button 107 are disposed on a right side of the monitor 102. By operating the mode selection switch 104, the user switches between the image playback mode and the shooting mode and selectively turns on and off the power. The operating button 105, the set button 106, and the menu button 107 are used when the camera 100 performs various operations.

In the example shown in the figure, the monitor 102 has a touch panel and receives instructions corresponding to user's touch operations. The operating button 105 has four buttons, i.e., up, down, right, and left buttons. The user provides the camera 100 with a shooting instruction or an image playback instruction and sets focus parameters, using the operating button 105, the set button 106, and the menu button 107.

When the mode selection switch 104 is on a left side in the figure, the camera 100 goes into the image playback mode (play), and when the mode selection switch 104 is set on a right side in the figure, the camera 100 goes into the shooting mode (camera). When the mode selection switch 104 is set in the middle, the camera 100 is powered off.

Figure 2:
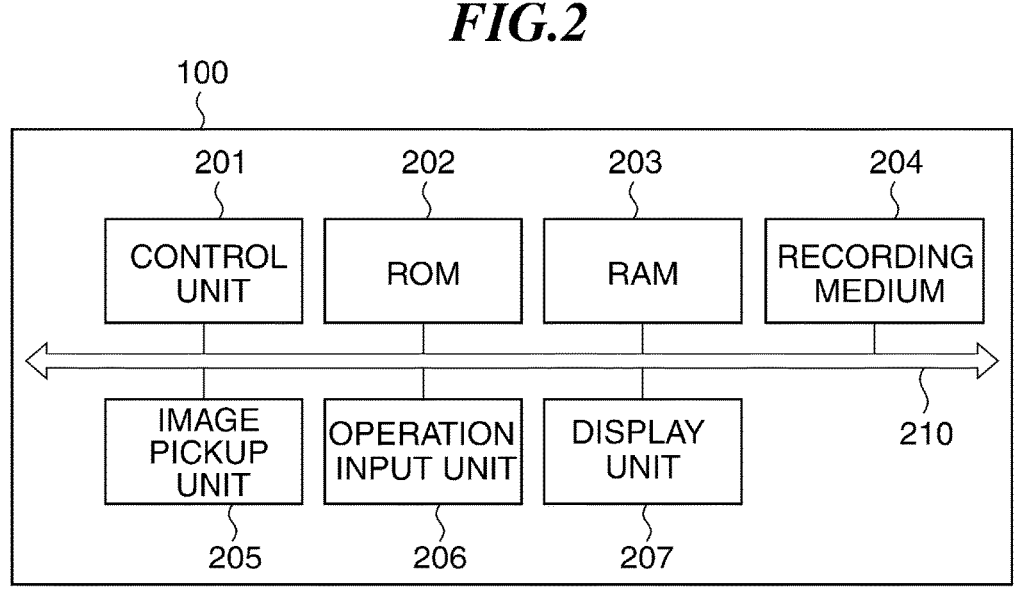
FIG. 2 is a block diagram showing an exemplary hardware arrangement of the image pickup apparatus according to the present invention.

FIG. 2 is a block diagram showing an example of the hardware arrangement of the camera in FIG. 1.

The camera 100 has a control unit 201, which controls the overall camera 100. The control unit 201 is, for example, a central processing unit (CPU).

Programs, parameters, and so on are stored in a read-only memory (ROM) 202. Here, control programs required for processing in the camera 100 are recorded in the ROM 202. As one of the control programs, a shooting processing program, as described below, is recorded as a program code readable by the control unit 201 in the ROM 202, and the control unit 201 executes this program code to carry out a shooting process.

It should be noted that the ROM 202 in the figure is, for example, a flash ROM on which the control programs are rewritable.

Programs and data supplied from external devices are temporarily stored in a random-access memory (RAM) 203. The control programs recorded in the ROM 202 are expanded on the RAM 203 and executed. The RAM 203 is also used as a work area for the control unit 201.

A recording medium (recording unit) 204 is, for example, a memory card removable from the camera 100, and digital data such as image data is recorded as a file in the recording medium 204. It should be noted that the recording medium 204 may be in another form such as a magnetic or optical card, or an IC card.

The image pickup unit 205 has a taking lens unit (hereafter referred to merely as lenses), a shutter, a diaphragm, an image pickup device, and so on. As described below, the image pickup unit 205 outputs an image signal corresponding to an input optical image. Here, the image pickup device has micro lens arrays for pixels, and thus obtains image signals using the light field technique as described below.

An operation input unit 206 is comprised, for example, the shutter button 103, the mode selection switch 104, the operating button 105, the set button 106, and the menu button 107 in FIG. 1.

A display unit 207, which is the monitor 102 in FIG. 1, has the touch panel as described earlier, and the user sets focus parameters using the touch panel at the time of captured image review.

It should be noted that the control unit 201, the ROM 202, the RAM 203, the recording medium 204, the image pickup unit 205, the operation input unit 206, and the display unit 207 are connected to one another via a system bus 210.

Figure 3A:
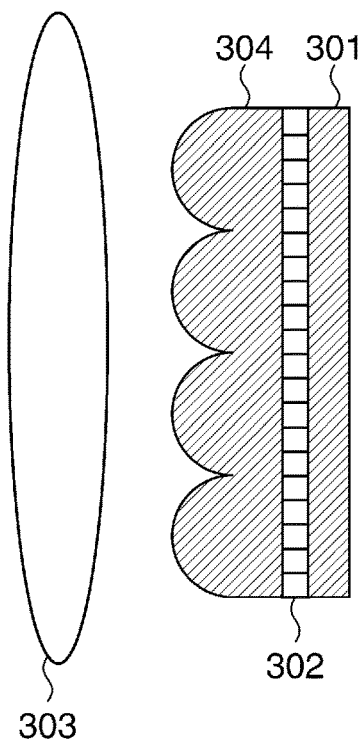
FIGS. 3A and 3B illustrate an exemplary arrangement of an image pickup unit according to the present invention.
Figure 3B:
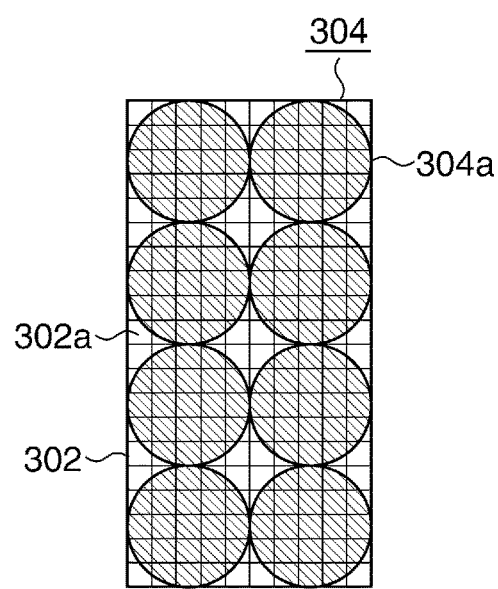

FIGS. 3A and 3B are views useful in explaining an exemplary arrangement of the image pickup unit 205 in FIG. 2. FIG. 3A is a view schematically showing the image pickup unit 205 as seen from a lateral side, and FIG. 3B is a view schematically showing the image pickup unit 205 as seen from a front side. It should be noted that the shutter, the diaphragm, and so on are omitted in the example shown in the figures.

In the example shown in FIGS. 3A and 3B, only a part of the image pickup device is shown for convenience of explanation. The image pickup device 301 includes an image sensor (for example, a CMOS image sensor) 302 and a plurality of microlens (ML) arrays 304. The ML arrays 304 are disposed on a front side (that is, a lens 303 side) of the image sensor 302 (see FIG. 3A).

The image sensor 302 has a plurality of pixels 302a arrayed in a two-dimensional matrix, and one ML array 304 has a plurality of MLs 304a. In the example shown in FIG. 3B, one ML 304a is associated with 5×5 pixels 302a. It should be noted that at least one ML array 304 differs from the other ML arrays 304 in terms of focal length.

When an image pickup process is carried out in response to one pressing operation of the shutter button 103 using the image pickup unit 205 described above, at least one ML array 304 differs from the other ML arrays 304 in terms of focal length, and hence a plurality of image signals differing in focal length (that is, image signals having a plurality of focuses) are obtained from the image sensor 302. The image signals are recorded in the recording medium 204 after an image pickup process. As a result, the camera 100 shown in the figures obtains a plurality of pieces of RAW data using the light field technique (light field images).

It should be noted that light field images may be obtained with an arrangement different from the arrangement shown in FIGS. 3A and 3B. Light field images are recorded as RAW data in the recording medium 204. A refocusing process, as described below, is carried out on the light field images to generate a developed image file such as JPEG data.

Figure 4:
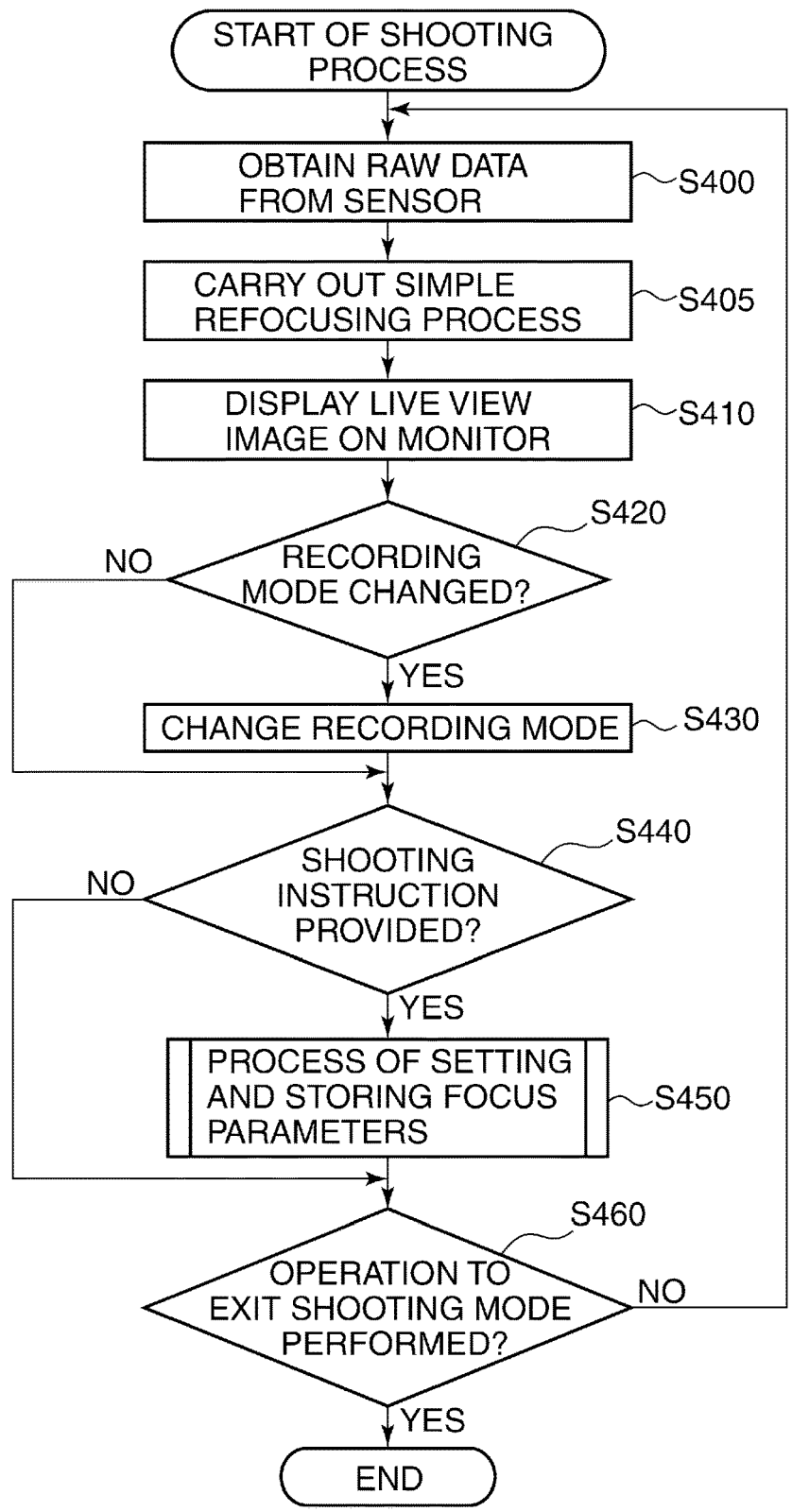
FIG. 4 is a flowchart illustrating a shooting process which is carried out by the image pickup apparatus according to the present invention.

FIG. 4 is a flowchart useful in explaining a shooting process which is carried out by the camera in FIG. 2.

Here, the shooting process in the flowchart of FIG. 4 is carried out under the control of the control unit 201. Specifically, the control unit 201 carries out the shooting process by loading a control program (a shooting process program) stored in the ROM 202.

It should be noted that the control program may be recorded in the recording medium 204, and further, the control program may be loaded from a network.

As described above, the camera 100 has a shooting mode and an image playback mode, and when the shooting mode is selected, a process of capturing image data and recording the image data in the recording medium 204 is carried out. On the other hand, when the image playback mode is selected, a process of reading the image data from the recording medium 204 and playing back the image data is carried out.

When the shooting process is to be carried out, as described above, the mode selection switch 104 is placed on the right side (camera side) as viewed in FIG. 1 to set the shooting mode. When the shooting mode is set, the control unit 201 obtains RAW data corresponding to image signals which are output from the image sensor 302 provided in the image pickup unit 205 (step S400).

The control unit 201 then carries out a development process including a simple refocusing process on the RAW data to generate preview image data (step S405). This simple refocusing process is a process for generating preview image data and is intended to shorten processing time and display an image on the display unit 207. Here, the preview image data is generated with a deep depth of field, that is, a short focal length so that an image on the display unit 207 can be easily seen.

The control unit 201 then displays an image corresponding to the preview image data on the display unit 207 (step S410). The control unit 201 then determines whether or not the recording mode (that is, the setting recording mode) has been changed by user operation (step S420).

It should be noted that there are two recording modes, i.e., a "RAW recording mode (first recording mode)" in which RAW data is recorded and a "JPEG recording mode (second recording mode)" in which JPEG data is recorded as developed image data. One of the first recording mode and the second recording mode is set as a setting recording mode.

When the recording mode has been changed by user operation (YES in step S420), the control unit 201 changes recording mode-related information to the recording mode set by the user (step S430). The control unit 201 determines whether or not a shooting instruction (that is, pressing of the shutter button 103) has been provided by the user (step S440).

It should be noted that when the control unit 201 determines that the recording mode has not been changed by user operation (NO in step S420), the process proceeds to step S440.

When the shooting instruction has been provided by the user (YES in step S440), the control unit 201 sets and stores focus parameters, as described below, (hereafter referred to as the process of setting and storing focus parameters) (step S450). After that, the control unit 201 determines whether or not an operation to exit the shooting mode has been performed by the user (step S460).

It should be noted that when the control unit 201 determines that the shooting instruction has not been provided by the user (NO in step S440), the process proceeds to step S460.

When an operation to exit the shooting mode has been performed (YES in step S460), the control unit 201 ends the shooting process. On the other hand, when the control unit 201 determines that an operation to exit the shooting mode has not been performed by the user (NO in step S460), the process returns to step S400. It should be noted that when the power is turned off or the mode is switched to the image playback mode, the control unit 201 determines that an operation to exit the shooting mode has been performed.

In the shooting mode, the processes from step S400 to step S460 are repeatedly carried out, and live view images are displayed on the display unit 208 in real time. The control unit 201 then accepts a shooting instruction and a recording mode changing operation.

Figure 5A:
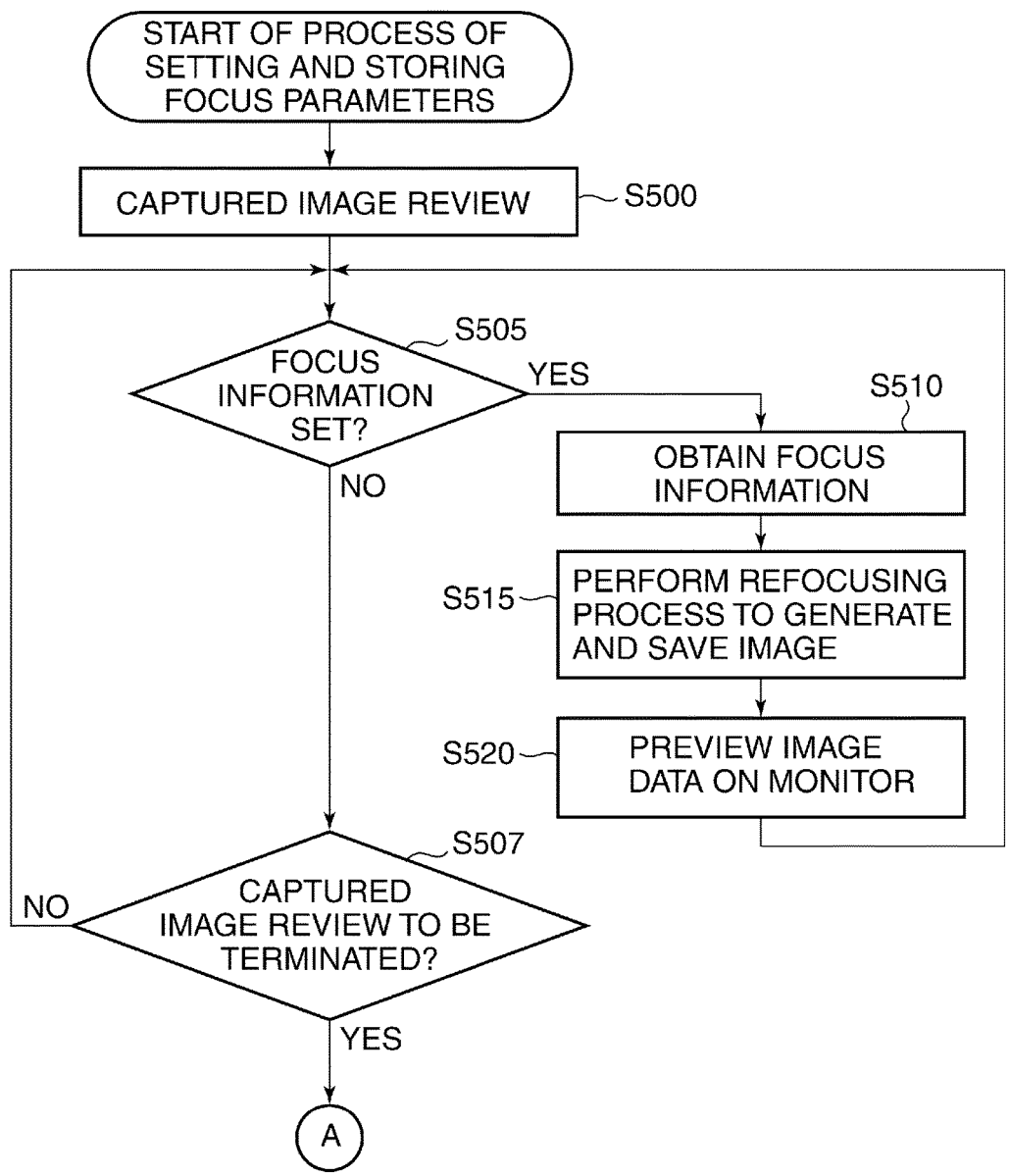
FIGS. 5A and 5B are flowcharts illustrating a process of setting and storing focus parameters in step S450 in FIG. 4.
Figure 5B:
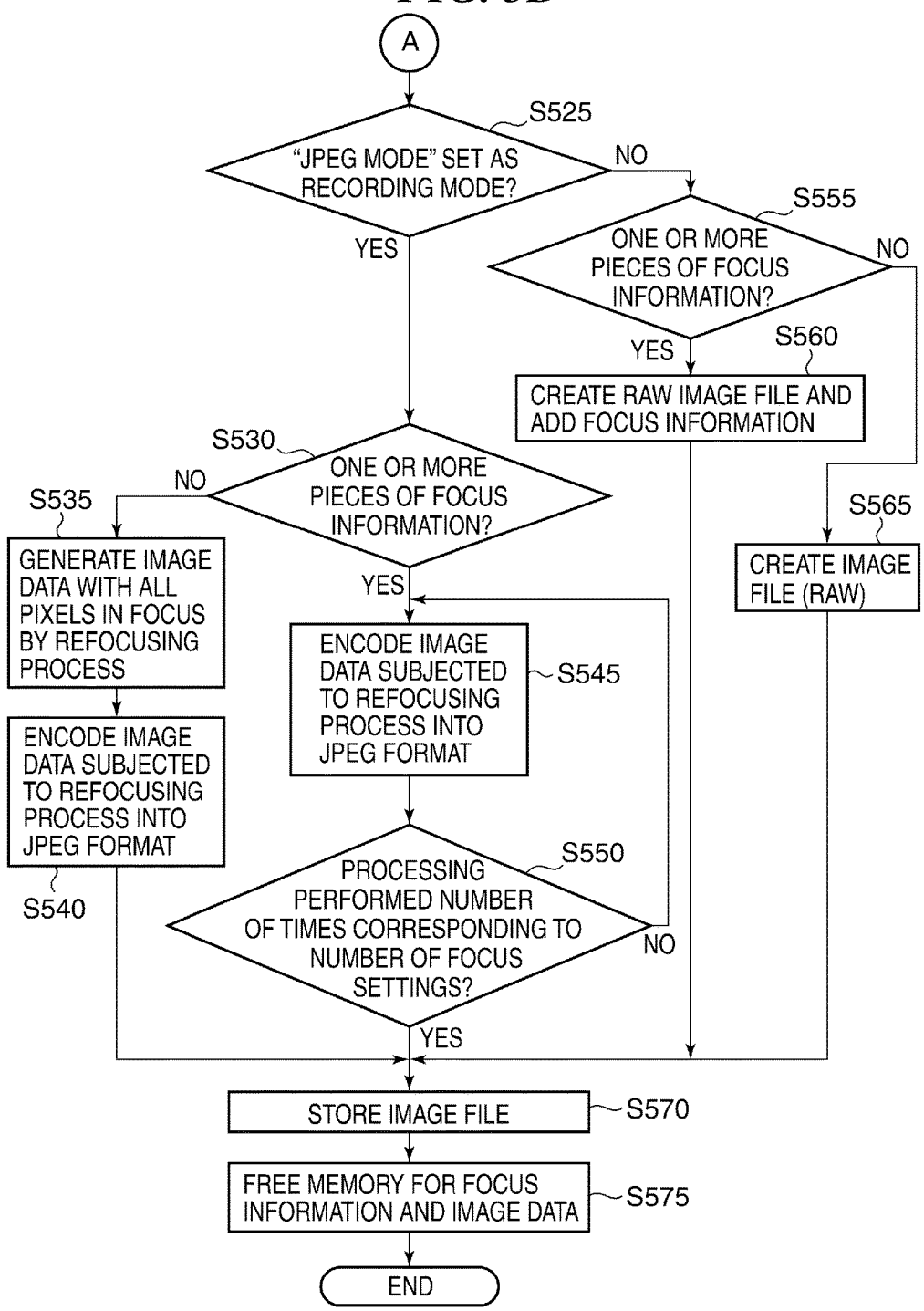

FIGS. 5A and 5B are flowcharts useful in explaining the process of setting and storing focus parameters in step S450 in FIG. 4.

As described with reference to FIG. 4, when the user provides the shooting instruction, the control unit 201 starts the process of setting and storing focus parameters. First, immediately after the image is captured, the control unit 201 controls the display unit 207 to display a preview image based on image data obtained by the shooting process (step S500).

It should be noted that in the process in step S500, focus information has not yet been set, and hence the control unit 201 carries out the development process under a predetermined condition on image data obtained from an image sensor when receiving the shooting instruction in step S440 as is the case with step 414, to generate preview image data and display the preview image as a captured image review on the display unit 207.

Next, the control unit 201 determines whether or not focus information has been set by user operation (step S505). To set focus information, the user taps on a desired subject on the preview image displayed on the display unit 207.

In response to this tapping (that is, touching), the control unit 201 obtains a focal length from the camera 100 to the subject using a well-known method. The control unit 201 then sets the obtained focal length as focus information.

During the tapping, the control unit 201 detects a point at which a finger of the user releases a display screen of the display unit 207. Thus, during the tapping, by touching the display screen of the display unit 207 with the finger and dragging the finger without lifting it, the user adjusts a desired position (that is, a position of the subject).

It should be noted that although a position of the subject is designated on the screen by tapping, focus information may be set in another way. For example, by inputting a value to designate a focal length using an operating button, the control unit 201 may set the designated focal length as focus information.

When no focus information has been set by user operation (NO in step S505), the control unit 201 determines whether or not the captured image review has continued for a predetermined time period (for example, four seconds) or longer. Namely, the control unit 201 determines whether or not to terminate (that is, stop) the captured image review (step S507).

When the control unit 201 determines that the captured image review has not continued for the predetermined time period or longer (NO in step S507), the process returns to step S505. On the other hand, when the control unit 201 determines that the captured image review has continued for the predetermined time period or longer (YES in step S507), the process proceeds to step S525, as described below.

When in step S505, focus information has been set by user operation (YES in step S505), the control unit 201 obtains the focus information (step S510). The control unit 201 then generates developed image data by carrying out the development process such as a refocusing process, RGB process, and color adjustment on RAW data based on the obtained focus information. After that, the control unit 201 saves the developed image data and the focus information in association with each other in the RAM 203 (step S515).

It should be noted that in the refocusing process, a plurality of pieces of data having different focal points is synthesized together. On this occasion, the control unit 201 generates developed image data by carrying out a refocusing process so as to put a focus at a focal length according to the focus information.

The control unit 201 then carries out a process in which it displays the developed image data on the display unit 207. Specifically, the control unit 201 generates preview image data based on the developed image data and displays an image corresponding to the preview image data on the display unit 207 (step S520). The control unit 201 then resets the captured image review time (that is, elapsed time of performing the captured image review). After that, the process returns to step S505.

By repeatedly carrying out the processes in step S505 to step S520 in this manner, the user is allowed to set focus information during the captured image review any number of times. Further, when the captured image review has continued for the predetermined time period or longer without the user performing an operation to set focus information, an image recording process is started as described below.

As described above, when in step S507, the captured image review has continued for the predetermined time period or longer (YES in step S505), the control unit 201 determines whether or not the JPEG recording mode is set as the recording mode (step S525). When the JPEG recording mode is set as the recording mode (YES in step S525), the control unit 201 determines whether or not there is one or more pieces of focus information (step S530).

When there is not one or more pieces of focus information (namely, the number of focus information is 0), in other words, when no focus information is set in the JPEG recording mode (NO in step S530), the process proceeds to step S535 in which the control unit 201 carries out a refocusing process in which it generates developed image data with all pixels in focus (all-focused image, pan-focus) (step S535). It should be noted that here, the control unit 201 may use the image data generated in step S405 in FIG. 4.

Then, the control unit 201 carries out a process in which it encodes the image data generated in step S535 into JPEG format (step S540). After that, the process proceeds to step S570, as described below.

When focus information is set in the JPEG recording mode (YES in step S530), the control unit 201 carries out a process in step S545 in which it encodes the image data saved in the RAM 203 in step S515 into JPEG format and generates a JPEG image file (step S545). The control unit 201 then determines whether or not all the RAW data for which the focus information has been set has been encoded into JPEG format (step S550).

When the control unit 201 determines that all the RAW data for which the focus information has been set has not been encoded into JPEG format (NO in step S550), the process returns to step S545. On the other hand, when the control unit 201 determines that all the RAW data for which the focus information has been set has been encoded into JPEG format (YES in step S550), the process proceeds to step S570, as described below.

By repeatedly carrying out the processes in steps S545 and S550 described above, one RAW data is subjected to JPEG encodings corresponding in number to the number of pieces of focus information set by the user to generate a JPEG image file. As a result, a plurality of JPEG image files corresponding to the number of pieces of focus information are generated.

On the other hand, when the JPEG recording mode is not set as the recording mode (NO in step S525), that is, when the RAW recording mode is set as the recording mode, the control unit 201 determines whether or not there is one or more pieces of focus information in the RAW recording mode (step S555). When the control unit 201 determines that there is one or more pieces of focus information (YES in step S555), that is, focus information is set in the RAW recording mode, the process proceeds to step S560, in which the control unit 201 carries out a process in which it generates a RAW image file and associates a plurality of pieces of the focus information with the RAW image file (step S560). The process then proceeds to step S570.

It should be noted that in the process in step S560, even when there is a plurality of pieces of focus information, the plurality of pieces of focus information is associated with one RAW image file.

Figure 6:
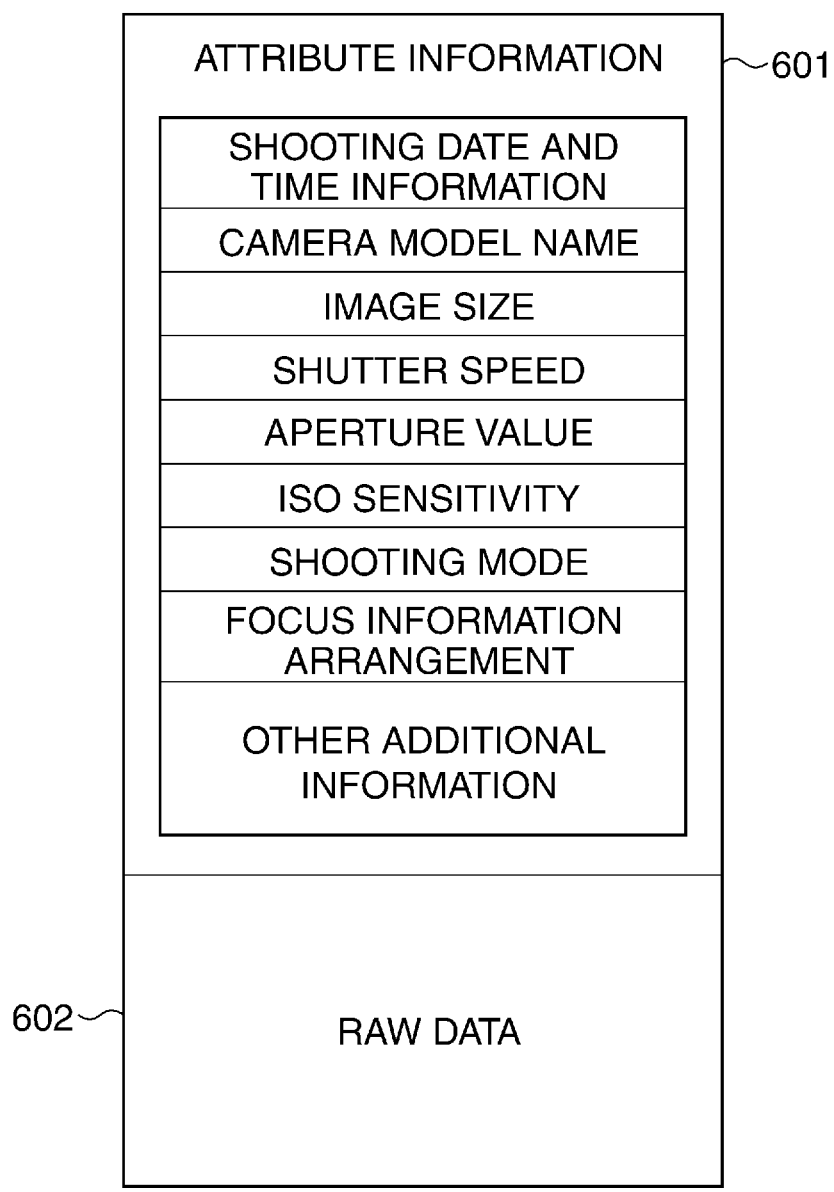
FIG. 6 is a diagram showing an exemplary structure of a RAW image file which is generated in the process in FIGS. 5A and 5B.

FIG. 6 is a diagram showing an exemplary structure of a RAW image file which is generated in the process in FIGS. 5A and 5B.

The RAW image file has a header section 601 and an image data section 602, and attribute information is recorded in the header section 601. RAW data obtained by all the ML arrays is recorded in the image data section 602.

As shown in the figure, for example, shooting date and time information, camera model name, image size, shutter speed, aperture value, ISO sensitivity, shooting mode, focus information arrangement, and other additional information are recorded as the attribute information. Since the focus information arrangement is recorded here, a plurality of pieces of focus information is allowed to be associated with one RAW image file.

It should be noted that a focus position as well as a focal length described above are recorded as focus information. Further, information other than a focal length and a focus position may be recorded as the focus information. Here, a focus position means a point designated by the user tapping on it, that is, a position on an image in which there is a desired subject.

Referring again to FIG. 5B, when no focus information is set in the RAW recording mode (NO in step S555), the control unit 201 carries out a process in which it generates a RAW image file (step S565). On this occasion, the control unit 201 sets the focus information arrangement in FIG. 6 to a null.

After the process in step S540, S550, S560, or S565, the control unit 201 carries out a process in which it stores the JPEG image file or the RAW image file in the non-volatile recording medium 204 (step S570) such as a memory card. After that, the control unit 201 releases the focus information, the image data, and so on saved in the RAM 203 (step S575). Then, the control unit 201 ends the process of storing focus parameters.

It should be noted that although in the above description, no upper limit is placed on the number of pieces of focus information to be set, there may be an upper limit.

As described above, according to the first embodiment of the present invention, the user is allowed to set focus information during the captured image review. The user is thus allowed to perform an operation to set a plurality of pieces of focus information in a sequential shooting process.

Further, the image storing process varies with the recording mode (the RAW recording mode or the JPEG recording mode) and focus information. As a result, focus information is set through the same operation irrespective of recording mode, and an image file suitable for the recording mode can be easily generated.

Particularly, in a light field camera as well, a developed image file for which focus information is set can be generated with little time and effort. For example, when the JPEG recording mode is set as the recording mode, JPEG image data corresponding in number to the number of pieces of focus information is allowed to be stored.

On the other hand, when the RAW recording mode is set as the recording mode, focus information is allowed to be stored in association with a RAW image file. As a result, to generate a JPEG image file or the like from a RAW image file, a refocusing process can be easily carried out using focus information added in advance.

It should be noted that although in the first embodiment described above, the JPEG recording mode and the RAW recording mode are taken as examples of recording modes, there may be a "RAW+JPEG recording mode" in which a JPEG image file and a RAW image file are recorded at the same shooting process. In this case, that is, when the "RAW+JPEG recording mode" is set, a recording process for both JPEG data and RAW data is carried out.

A description will now be given of a camera according to a second embodiment of the present invention. It should be noted that an arrangement of the camera according to the second embodiment is the same as that of the camera shown in FIGS. 1 and 2, and an arrangement of the image pickup unit 205 according to the second embodiment is also the same as that of the image pickup unit shown in FIG. 3.

The camera according to the second embodiment has a function of setting focus parameters during live view shooting (that is, before accepting a shooting instruction) in addition to the functions of the camera according to the first embodiment described above. The camera according to the second embodiment also has a function of adding and changing focus information during the captured image review. It should be noted that focus parameters are adjusted using the touch panel.

Figure 7:
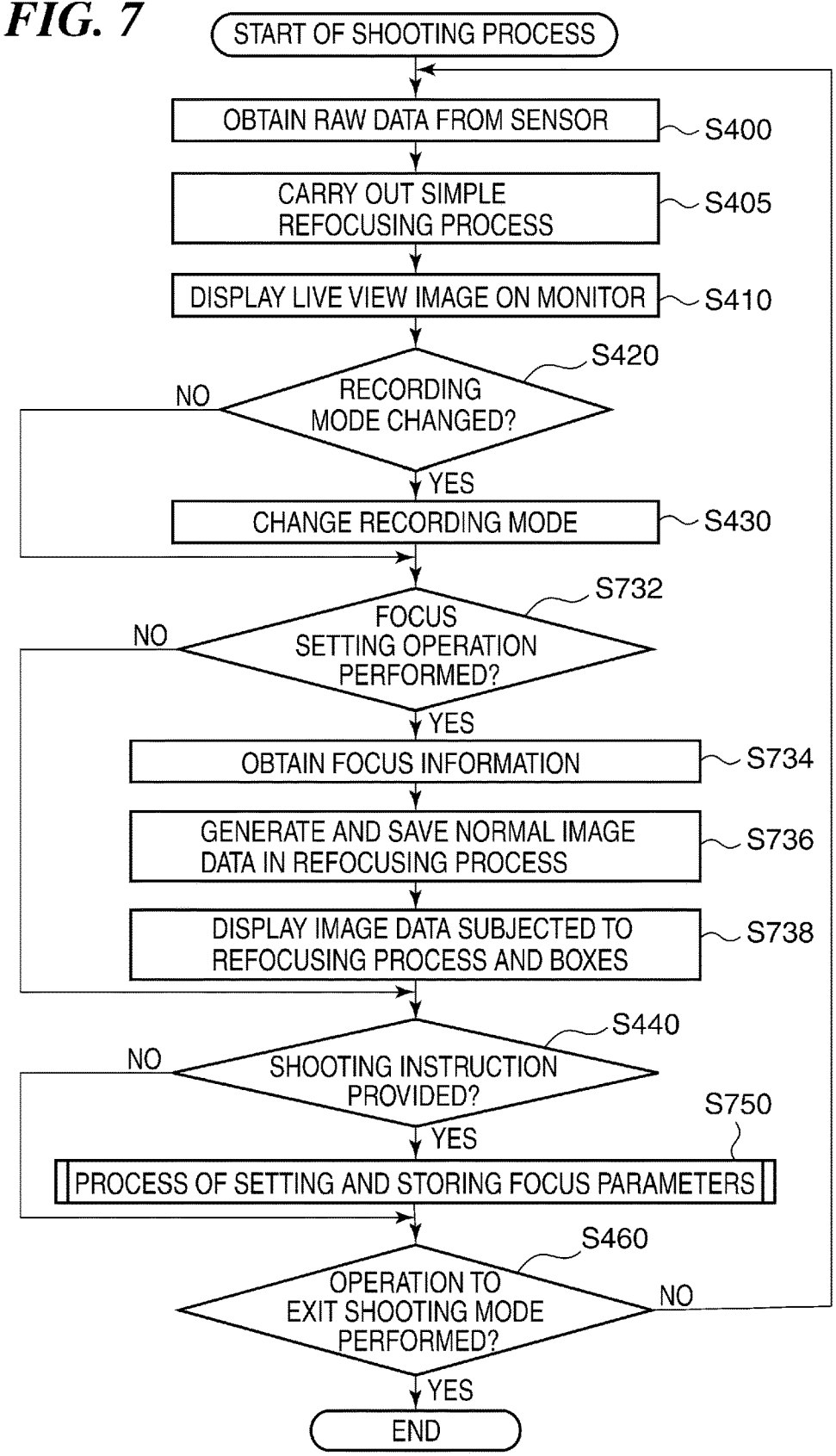
FIG. 7 is a flowchart illustrating a shooting process which is carried out by the image pickup apparatus according to the present invention.

FIG. 7 is a flowchart useful in explaining a shooting process which is carried out by the camera according to the second embodiment of the present invention.

It should be noted that a process in the flowchart of FIG. 7 is carried out under the control of the control unit 201. In the flowchart of FIG. 7, the same steps as those in the flowchart of FIG. 4 are designated by the same reference symbols, and description thereof is omitted.

When a shooting process is to be carried out, the shooting mode is set by placing the mode selection switch 104 on the right side (camera side) as viewed in FIG. 1 as described above. When the shooting process is started, the control unit 201 carries out the processes in steps S400 to S430 described above with reference to FIG. 4.

The control unit 201 then determines whether or not focus information has been set by user operation (step S732). When the control unit 201 determines that no operation to set focus information has been performed (NO in step S732), the process proceeds to step S440 described above with reference to FIG. 4.

On the other hand, when an operation to set focus information has been performed (YES in step S732), the control unit 201 obtains the focus information set in step S732 (step S734). After that, the control unit 201 carries out a refocusing process on RAW data based on the focus information to generate a developed image file. The control unit 201 then associates the developed image file and the focus information with each other and saves them in the RAM 203 (step S736).

In this case, to indicate that the focus information was set during the live view shooting process, the control unit 201 saves the focus information as in-shooting focus information in the RAM 203.

The control unit 201 then carries out a process in which it displays the developed image file generated in step S736 on the display unit 207 (step S738). On this occasion, the control unit 201 indicates a point tapped on by the user with a box so that a focus point set by the user can be clear. When a plurality of focus points are set, the control unit 201 displays a plurality of boxes on the display unit 207. After the process in step S738, the process proceeds to step S440.

When in step S440, a shooting instruction has been provided, the control unit 201 carries out a process of setting and storing focus parameters, as described below (step S750), and the process proceeds to step S460.

Figure 8A:
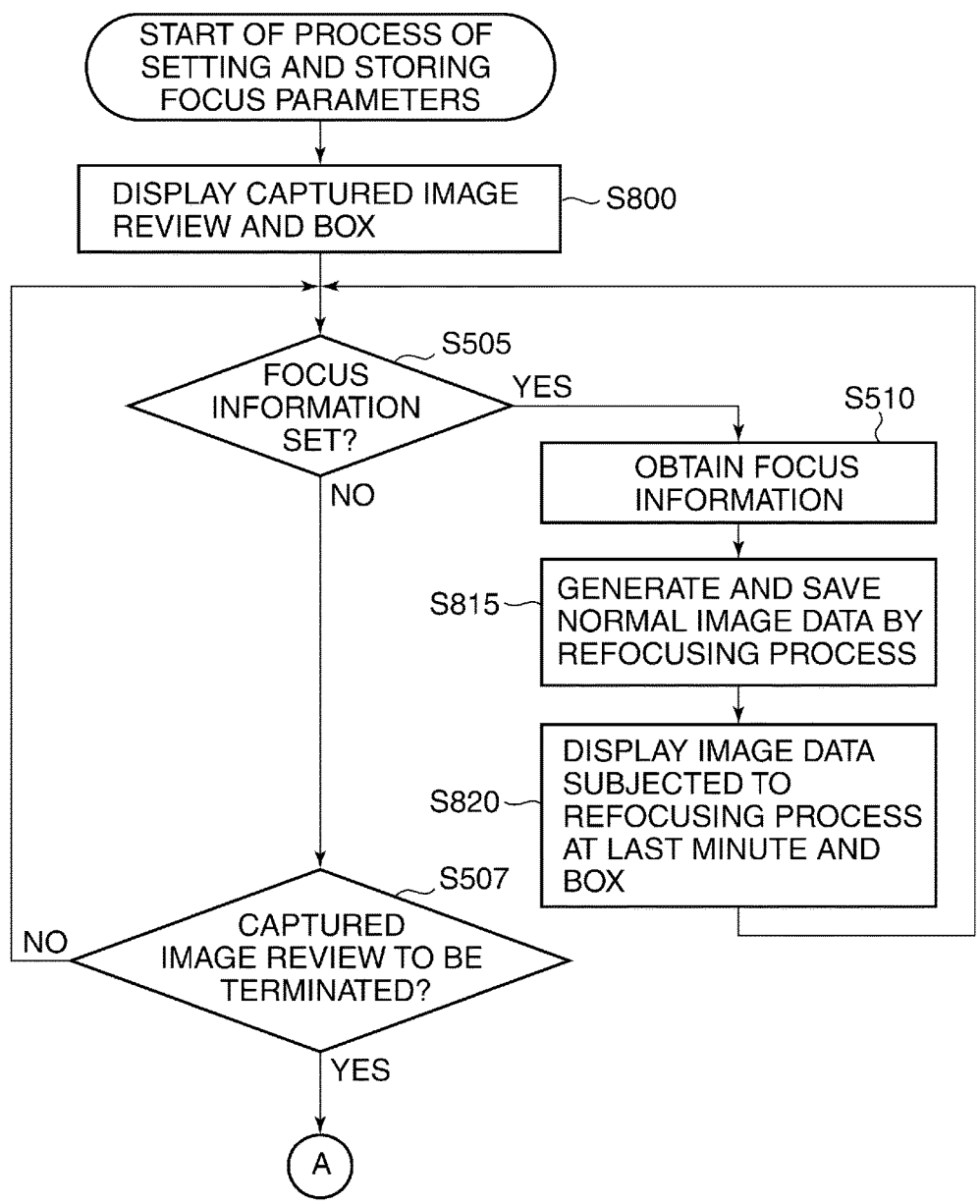
FIGS. 8A and 8B are flowcharts illustrating a process of setting and storing focus parameters in step S750 in FIG. 7.
Figure 8B:
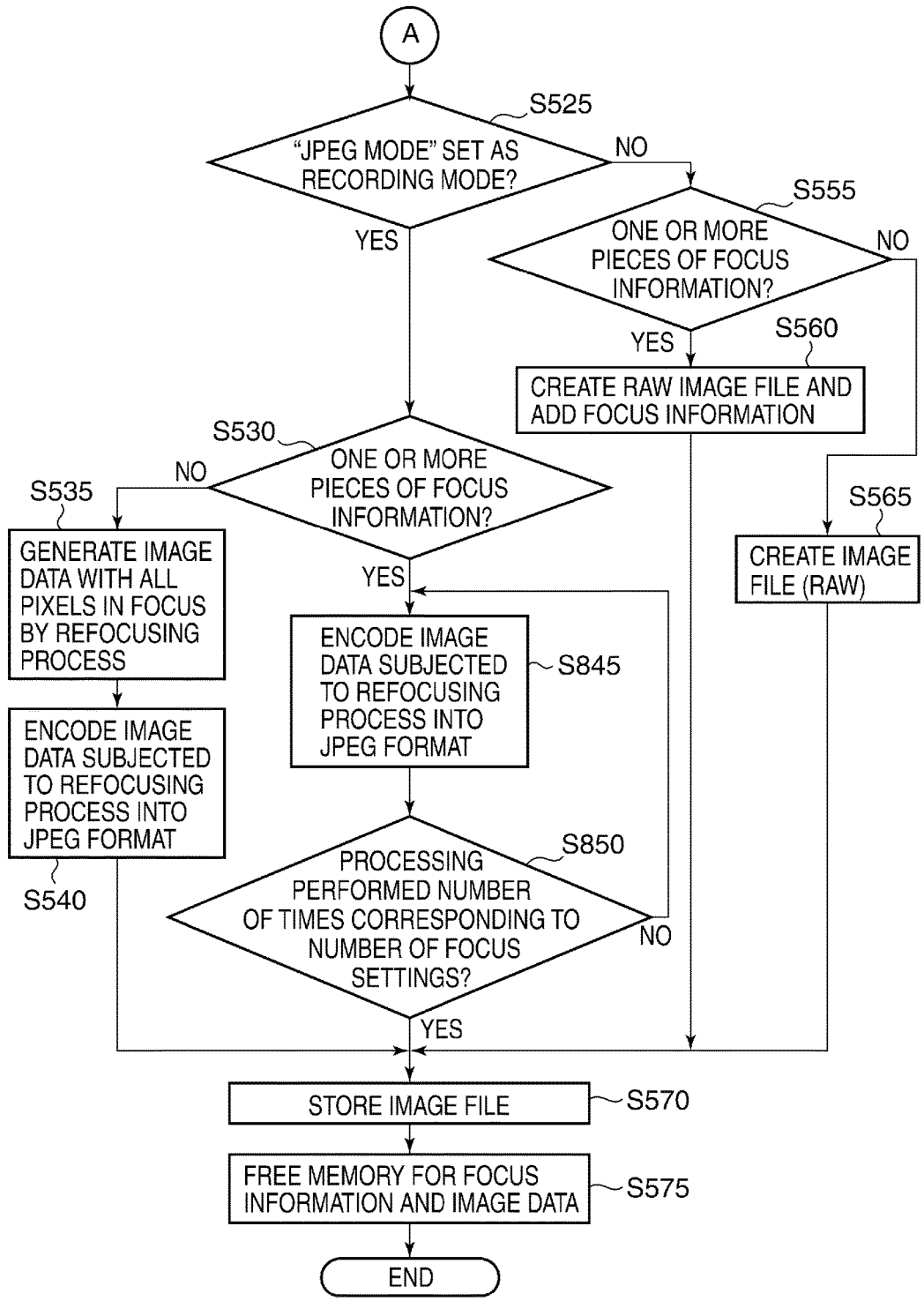

FIGS. 8A and 8B are flowcharts explaining the process of setting and storing focus parameters in step S750 in FIG. 7.

It should be noted that in FIGS. 8A and 8B, the same steps as those in the process of setting and storing focus parameters shown in FIGS. 5A and 5B are designated by the same reference symbols, and description thereof is omitted.

As described above with reference to FIG. 7, when the user provides a shooting instruction, the control unit 201 starts the process of setting and storing focus parameters. First, the control unit 201 displays image data obtained by shooting on the display unit 207 (step S800). Specifically, immediately after the image is taken, the control unit 201 displays image data obtained by the shooting process on the display unit 207.

On this occasion, when it is determined in step S732 in FIG. 7 that focus information was set before the shooting instruction, the control unit 201 displays a focus point set by the user on the display unit 207 with a box.

When in step S505, focus information has been set by user operation (YES in step S505), the control unit 201 obtains the set focus information in step S510 as described above. The control unit 201 then carries out a refocusing process on RAW data based on the focus information to generate a developed image file.

After that, since the focus information was set during the captured image review, the control unit 201 assumes the focus information as post-shooting focus information, associates the developed image file and the post-shooting focus information with each other, and saves them in the RAM 203 (step S815).

The control unit 201 then carries out a process in which it displays the developed image file on the display unit 207. Specifically, the control unit 201 generates preview image data based on the developed image file and displays an image corresponding to the preview image data on the display unit (monitor) 207 (step S820). On this occasion, the control unit 201 resets the captured image review time (that is, elapsed time of performing the captured image review).

Further, in step S820, the control unit 201 indicates a focus point set by the user with a box on the display unit 207 so that the set focus point can be clear. On this occasion, the control unit 201 indicates a focus point set at the time of live view shooting (that is, before shooting instruction) with a solid line and indicates a focus point set at the time of the captured image review with a dotted line so that setting timings of focus parameters can be distinguished from each other. After that, the process returns to step S505.

Figure 9A:
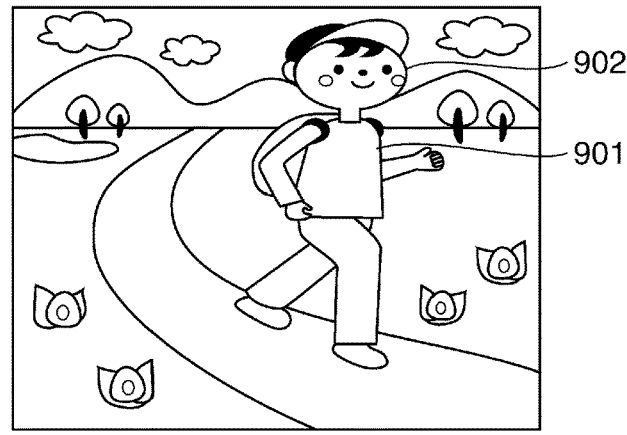
FIGS. 9A to 9C are views of a display unit of the image pickup apparatus according to the present invention.
Figure 9B:
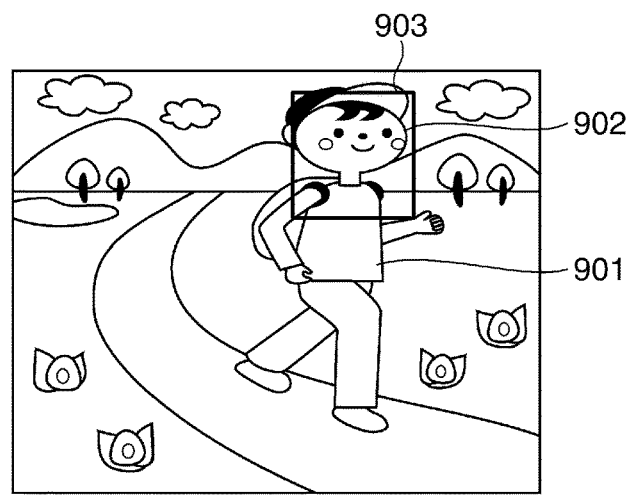
Figure 9C:
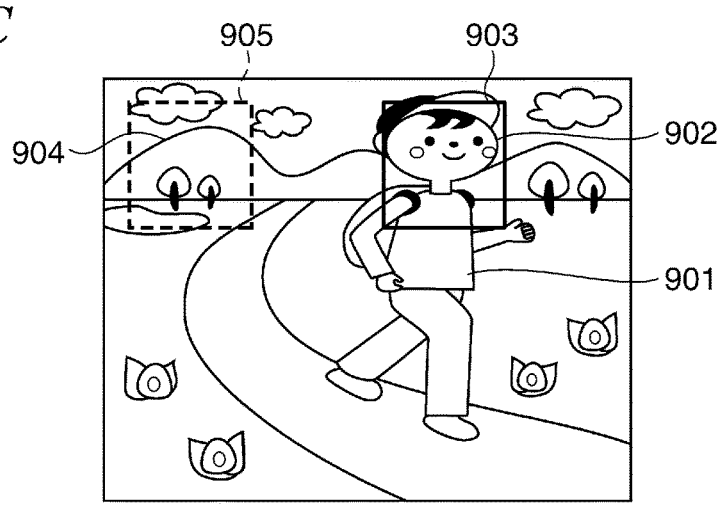

FIGS. 9A to 9C are views useful in explaining how boxes are displayed by the camera according to the second embodiment of the present invention. FIG. 9A illustrates an exemplary preview image before a shooting instruction in a state where no focus information has been set. FIG. 9B illustrates an exemplary preview image in a case where a focus parameter is set during the live view shooting before a shooting instruction. FIG. 9C illustrates an exemplary preview image in a case where a focus parameter is set during the captured image review after shooting instruction.

Assume now that a live view image in which there is a person 901 shown in FIG. 9A is displayed on the display unit 207 before a shooting instruction in a state where no focus information has been set. Assume that the user taps on a face 902 of the person 901 on this live view image.

As a result of this tapping, the control unit 201 determines that a focus parameter was set before the shooting instruction and displays a box 903 surrounding the face 902 on the live view image in step S738 in FIG. 7 (see FIG. 9B).

Assume that with the captured image in FIG. 9B being displayed on the display unit 207, the user performs a focus setting operation on a mountain 904 behind the person 901 during the captured image review after a shooting instruction. As a result of this focus setting operation (that is, tapping), the control unit 201 determines that a focus parameter was set during the captured image review and displays a box 905 about the mountain 904 on the preview image in step S820 in FIG. 8A (see FIG. 9C).

On this occasion, the control unit 201 displays the box 905 with a dotted line in association with the mountain 904 and displays the box 903 with a solid line so that setting timings of focus information can be distinguished from each other.

By repeatedly carrying out the processes from steps S505 to S820 in this manner, the user is allowed to set focus information during the captured image review any number of times. Further, when the captured image review has continued for a predetermined time period or longer without the user performing an operation to set focus information, an image recording process is started as described below.

When in step S530, focus information is set in the JPEG recording mode, the control unit 201 carries out a process in which it encodes the image data generated in steps S736 and S815 into JPEG format to generate a JPEG image file (step S845). The control unit 201 then determines whether or not all the image data for which the focus information has been set has been encoded into JPEG format (step S850).

When the control unit 201 determines that all the image data for which the focus information has been set has not been encoded into JPEG format (NO in step S850), the process returns to step S845. On the other hand, when all the image data for which the focus information has been set has been encoded into JPEG format (YES in step S850), the process proceeds to step S570 described above with reference to FIG. 5B.

By repeatedly carrying out the processes in steps S845 and S850 described above, JPEG encodings corresponding in number to the number of pieces of focus information set by the user is performed to generate a JPEG image file. Here, it includes both focus information during the period of live view shooting (that is, before shooting instruction) and focus information during the period of the captured image review.

As described above, in the second embodiment of the present invention, the user is allowed to set focus information at the time of the live view shooting as well (that is, before a shooting instruction is provided). As a result, before and after a shooting instruction, the user is allowed to perform an operation to set a plurality of pieces of focus information.

Further, in the second embodiment, when focus information have been set, points for which the focus information have been set are indicated with boxes, and moreover, display is controlled such that the boxes are displayed in a different manner according to the setting timings of the focus information. As a result, the user can easily determine whether a focus point was set before or after a shooting instruction.

It should be noted that in the second embodiment, focus information is added during the captured image review. The present invention, however, is not limited to this, but during the captured image review, focus information that has already been set is selected, and an operation to change the selected focus information such as an operation to delete the selected focus information or an operation to shift a focus point may be performed.

Moreover, although in the second embodiment described above, the user manually sets focus information before a shooting instruction, the control unit 201 may set focus information by identifying a person or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s), and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s), and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-076175, filed Apr. 2, 2014.

What is claimed is:
1. An image pickup apparatus comprising:
an obtaining unit configured to obtain data based on a plurality of signals having different focuses;
a generation unit configured to, when a shooting instruction has been received, generate a preview image by carrying out a development process on the obtained data using a focus parameter;

a display control unit configured to display the preview image on a display device for a predetermined time period;

a first setting unit configured to set a focal length based on an object in the preview image in response to a user operation made while the preview image is displayed on the display device;

a selection unit configured to select one of a plurality of recording modes in response to a user operation; and a storage control unit configured to, when a first recording mode is selected by said selection unit, provide control to store, into a recording medium, (a) first data, which is the obtained data, in association with (b) information indicative of the set focal length, and when a second recording mode is selected by said selection unit, provide control to store, into the recording medium, second data, which is generated by carrying out the development process on the obtained data using the set focal length, wherein, in a mode where the first data is stored into the recording medium, third data which has the same focal length as the second data is generated by carrying out the development process on the first data with the information indicative of the set focal length, and fourth data which has different focal length from the second data is generated by carrying out the development process on the first data with information other than the information indicative of the set focal length.

2. The image pickup apparatus as claimed in claim 1, wherein said storage control unit provides control to store, into the recording medium, the second data corresponding in number to a number of the set focal lengths.

3. The image pickup apparatus as claimed in claim 1, wherein when the focal length has not been set by said first setting unit and the second recording mode has been selected by said selection unit, said storage control unit provides control so that the second data obtained by carrying out the development process on the data obtained based on the plurality of signals so as to generate a pan-focus image is stored in the recording medium.

4. The image pickup apparatus as claimed in claim 1, further comprising a second setting unit configured to set the focal length before a shooting instruction is received, wherein when the focal lengths are set by each of said first setting unit and said second setting unit, said display control unit displays the preview image while making the focal length set by said first setting unit and the focal length set by said second setting unit able to be distinguished from each other.

5. The image pickup apparatus as claimed in claim 1, wherein said first setting unit adds and changes the focal length according to user operation.

6. A control method for an image pickup apparatus, the control method comprising:

an obtaining step of obtaining data based on a plurality of signals having different focuses;

a generation step of, when a shooting instruction has been received, generating a preview image by carrying out a development process on the obtained data using a focus parameter;

a display control step of displaying the preview image on a display device for a predetermined time period;

a first setting step of setting a focal length based on an object in the preview image in response to a user operation made while the preview image is displayed on the display device;

a selection step of selecting one of a plurality of recording modes in response to a user operation; and a storage control step of, when a first recording mode is selected in said selection step, provide control to store, into a recording medium, (a) first data, which is the obtained data, in association with (b) information indicative of the set focal length, and when a second recording mode is selected in said selection step, providing control to store, into a recording medium, second data, which is generated by carrying out the development process on the obtained data using the set focal length, wherein, in a mode where the first data is stored into the recording medium, third data which has the same focal length as the second data is generated by carrying out the development process on the first data with the information indicative of the set focal length, and fourth data which has different focal length from the second data is generated by carrying out the development process on the first data with information other than the information indicative of the set focal length.

7. A non-transitory computer-readable storage medium storing a program for causing a computer to execute a control method for an image pickup apparatus, the control method comprising:

an obtaining step of obtaining data based on a plurality of signals having different focuses;

a generation step of, when a shooting instruction has been received, generating a preview image by carrying out a development process on the obtained data using a focus parameter;

a display control step of displaying the preview image on a display device for a predetermined time period;

a first setting step of setting a focal length based on an object in the preview image in response to a user operation made while the preview image is displayed on the display device;

a selection step of selecting one of a plurality of recording modes in response to a user operation; and a storage control step of, when a first recording mode is selected in said selection step, providing control to store, into a recording medium, (a) first data, which is the obtained data, in association with (b) information indicative of the set focal length, and when a second recording mode is selected in said selection step, provide control to store, into a recording medium, second data, which is generated by carrying out the development process on the obtained data using the set focal length, wherein, in a mode where the first data is stored into the recording medium, third data which has the same focal length as the second data is generated by carrying out the development process on the first data with the information indicative of the set focal length, and fourth data which has different focal length from the second data is generated by carrying out the development process on the first data with information other than the information indicative of the set focal length.

* * * * *